(12) United States Patent
Chen et al.

(10) Patent No.: US 11,741,023 B1
(45) Date of Patent: Aug. 29, 2023

(54) POINTING DEVICE AND METHOD CAPABLE OF CORRECTING ITS USB STATE BY MONITORING VOLTAGE/STATE OF USB COMMUNICATION INTERFACE

(71) Applicant: PixArt Imaging Inc., Hsin-Chu (TW)

(72) Inventors: Ching-Chih Chen, Hsin-Chu (TW); Jr-Yi Li, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/668,348

(22) Filed: Feb. 9, 2022

(51) Int. Cl.
  *G06F 13/10* (2006.01)
  *G06F 13/38* (2006.01)
  *G06F 13/42* (2006.01)

(52) U.S. Cl.
  CPC .......... *G06F 13/102* (2013.01); *G06F 13/382* (2013.01); *G06F 13/4282* (2013.01); *G06F 2213/0042* (2013.01)

(58) Field of Classification Search
  CPC .............................. G06F 1/3209; G06F 13/385
  See application file for complete search history.

(56) References Cited

U.S. PATENT DOCUMENTS

| | | | | |
|---|---|---|---|---|
| 2015/0032908 A1* | 1/2015 | Remple | ................ | G06F 13/385 710/14 |
| 2015/0160705 A1* | 6/2015 | Chen | ...................... | G06F 1/266 713/300 |
| 2015/0220139 A1* | 8/2015 | Puthillathe | ............ | G06F 13/385 710/63 |
| 2015/0338897 A1* | 11/2015 | Maesono | .............. | G06F 1/3209 713/320 |
| 2015/0348603 A1* | 12/2015 | Lee | ...................... | G11C 29/028 365/189.09 |

* cited by examiner

*Primary Examiner* — Getente A Yimer
(74) *Attorney, Agent, or Firm* — Winston Hsu (57) ABSTRACT

A method of a pointing device which is used to be coupled to a host system through a universal serial bus (USB) communication interface includes: providing a USB driver device to communicate with the host system via the USB communication interface; monitoring a specific voltage change or a specific data transmission state of the USB communication interface to generate a monitoring result; and correcting a USB state of the USB driver device when the monitoring result indicates that a undefined or abnormal behavior of the host system occurs.

18 Claims, 5 Drawing Sheets

POINTING DEVICE AND METHOD CAPABLE OF CORRECTING ITS USB STATE BY MONITORING VOLTAGE/STATE OF USB COMMUNICATION INTERFACE

BACKGROUND OF THE INVENTION

1. Field of the Invention

The invention relates to a pointing device, and more particularly to a pointing device and method capable of correcting its USB state back to a last correct state.

2. Description of the Prior Art

Generally speaking, when a conventional pointing device is connected to a powered-down host system via the universal serial bus (USB) interface, ideally it will not be supplied with power by the host system and should be kept in a sleep state since the host system is powered down, and also light emitting unit (s) of the conventional pointing device will be turned off. However, in some situations due to that the circuit board of a host system is not well designed and/or other configurations for other type devices such as Apple's smart phones (but not limited), some undefined or abnormal behaviors may occur so that the USB state of the conventional pointing device may be erroneous and a user of such conventional pointing device may feel confused.

SUMMARY OF THE INVENTION

Therefore one of the objectives of the invention is to provide a pointing device and a method of the pointing device, to solve the above-mentioned problems.

According to embodiments of the invention, a pointing device which is used to be coupled to a host system through a universal serial bus (USB) communication interface is disclosed. The pointing device comprises a USB driver device and a processing circuit. The USB driver device is configured for communicating with the host system via the USB communication interface. The processing circuit is coupled to the USB driver device, and it is for arranged for controlling the USB driver device. The USB driver device is arranged for monitoring a specific voltage change or a specific data transmission state of the USB communication interface to generate a monitoring result, and for correcting a USB state of the USB driver device when the monitoring result indicates that an undefined or abnormal behavior of the host system occurs.

According to the embodiments, a method of the pointing device is disclosed. The method comprises: providing a USB driver device to communicate with the host system via the USB communication interface; monitoring a specific voltage change or a specific data transmission state of the USB communication interface to generate a monitoring result; and correcting a USB state of the USB driver device when the monitoring result indicates that a undefined or abnormal behavior of the host system occurs.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution of a pointing device such as a high performance mouse device (e.g. a gaming mouse device) which is capable of appropriately correcting its operational behavior/state, holding its correct state, or recovering its last correct state when an undefined operational behavior occurs in a communication protocol between the pointing device and a host system such as a computer system in a computer device such as notebook or personal computer.

Figure 1:
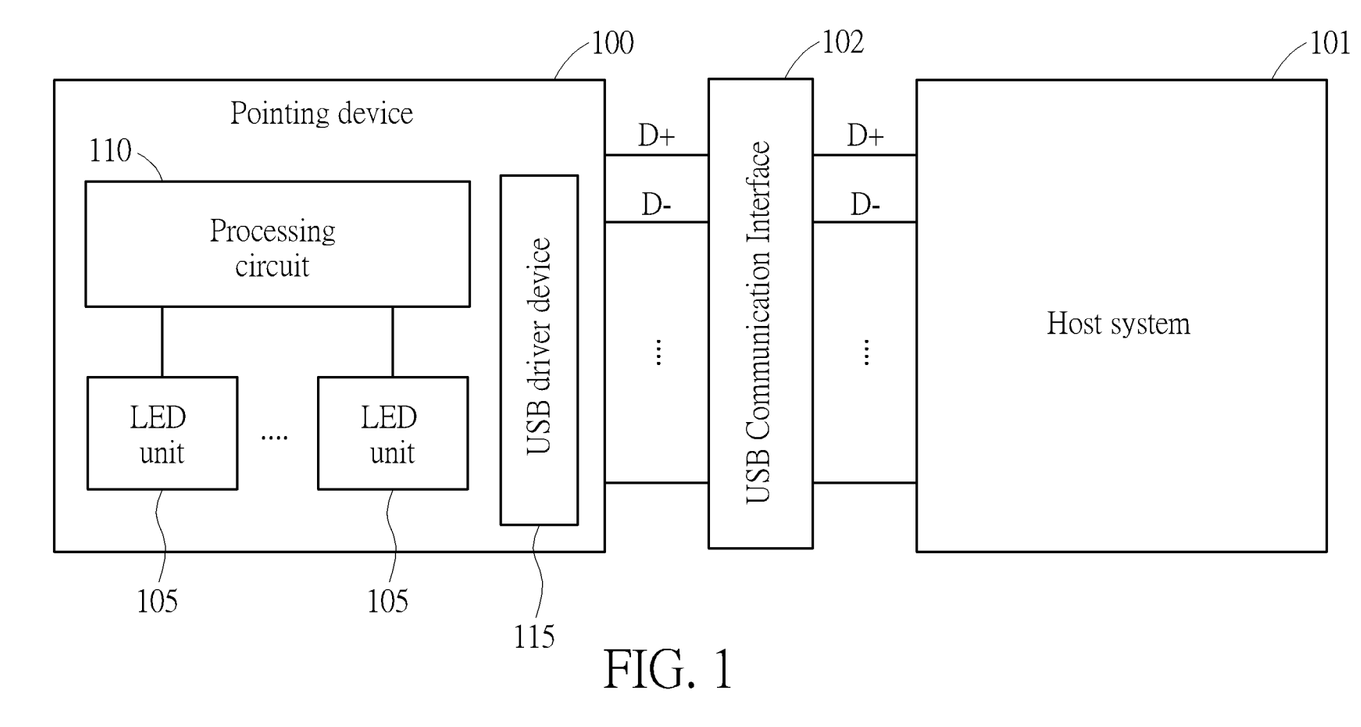
FIG. 1 is a block diagram of a pointing device according to an embodiment of the invention.

FIG. 1 is a block diagram of a pointing device 100 according to an embodiment of the invention. The pointing device 100 for example is a gaming mouse device (but not limited), and it is used to be coupled to a computer system such as a host system 101 in a notebook or in a personal computer device through a universal serial bus (USB) communication interface 102 which comprises multiple signal lines such as data lines D+ and D−. The pointing device 100 communicates with the host system 101 through USB communication protocol, and it comprises at least one light emitting unit 105 such as light emitting diode (LED) unit (but not limited), a processing circuit 110, and a driver gadget/device such as USB driver gadget/device 115.

An LED unit 105 for example is used for flashing lights into a surface which reflects lights into a sensor circuit while another LED unit 105 for example can be any peripheral LED unit; a peripheral LED unit maybe used for flashing light to indicate that the pointing device 100 is being charged or supplied with power; however, this is not intended to be a limitation. The processing circuit 110 is coupled to the LED unit(s) 105 and the USB driver device 115. The processing circuit 110 controls the USB driver device 115 communicating with the host system 101 via the USB communication interface 102. The behaviors/states/modes of the LED unit(s) 105 may be determined based on the USB state of USB driver device 115; equivalently, the behaviors/states/modes of the LED unit(s) 105 can be controlled by the processing circuit 110. For example, the light emission of the LED unit(s) 105 may be determined based on the USB state of USB driver device 115.

In the embodiment, the USB driver device 115 can correct the USB state of USB driver device 115, control the USB driver device 115 entering a correct state, hold the USB state, or make the USB state of USB driver device 115 be recovered back to the last correct state. In practice, the USB driver device 115 may be controlled by the processing circuit 110 (but not limited) to perform an analog detection such as USB charging port detection and/or a logic detection such as USB watchdog timer detection for the signal lines such as data lines D+ and D− (but not limited).

For a conventional pointing device, when such conventional pointing device is coupled to a host system which has been powered down, in this situation the powered down host system does not supply power for the conventional pointing device and the conventional pointing device should operate in a sleep state/mode (i.e. a power saving state or a low power state) different from a normal state/mode (i.e. a wake up state). However, due to that the circuit board of the powered down host system may not be well designed and/or the powered down host system may provide power for a specific type mobile phone such as iPhone device, the conventional pointing device may determine that it is in the normal state and then turn on its light flashing unit(s) to flash lights to give a hint for a user of the normal state of the conventional pointing device. Thus, the user may usually feel confused.

To solve these problems of the conventional pointing device, in one embodiment, when the host system 101 operates in an undefined or abnormal behavior, the processing circuit 110 can control the USB driver device 115 monitoring the state/communication of the USB communication interface 102 so as to determine/correct/recover the USB state of the USB driver device 115. By doing so, the USB state of the USB driver device 115 can be controlled at a correct state even though the undefined or abnormal behavior occurs. For example, the USB driver device 115 may be still kept at the last correct state (e.g. a sleep state) when the pointing device 100 is connected to the host system 102 but the host system 102 is powered down, and the LED unit(s) 105 are not turned on to flash lights. Thus, the user does not feel confused when the pointing device 100 is connected to a powered down system.

In practice, the processing circuit 110 is arranged for using the USB driver device 115 to monitor a specific voltage change or a specific data transmission state of the USB communication interface 102 to generate a monitoring result, determining, switching, or holding the USB state of USB driver device 115 according to the monitoring result.

For the analog detection, in one embodiment, the USB driver device 115 is arranged for monitoring at least one voltage level of at least one signal line such as data lines D+ and D− of the USB communication interface by using an analog-to-digital converter (ADC), to perform USB charging port detection. For example, when the USB driver device 115 exits the sleep state and enters an initialized state, the USB driver device 115 uses the ADC to detect and monitor the voltage levels at the data lines D+ and D− of the USB communication interface 102. If the voltage levels at the data lines D+ and D− are lower than a low threshold voltage such as 0.2 Volts (but not limited), then the USB driver device 115 may determine that no undefined/abnormal behaviors occur. In this situation, the USB driver device 115 determines that the protocol of USB communication interface 102 is successfully initialized. Then, the pointing device 100 may be charged by the host system 101 through the lines of USB communication interface 102. That is, when determining that no undefined/abnormal behaviors occur, the USB driver device 115 does not hold/keep the last correct state, i.e. the sleep state.

In another situation, once either the voltage level at the data line D+ or the voltage level at the data line D− is higher than the low threshold voltage when the USB driver device 115 exits the sleep state and enters the initialized state, the USB driver device 115 determines that an undefined/abnormal behavior occur and is arranged to recover the USB state from the initialized state back to the last correct state (i.e. the sleep state). That is, the USB driver device 115 can determine that the protocol of USB communication interface 102 is not successfully initialized, and the initialization is not successfully completed. In this situation, the light emissions of the LED units 105 can be turned off, so as to stop light emissions.

Figure 2:
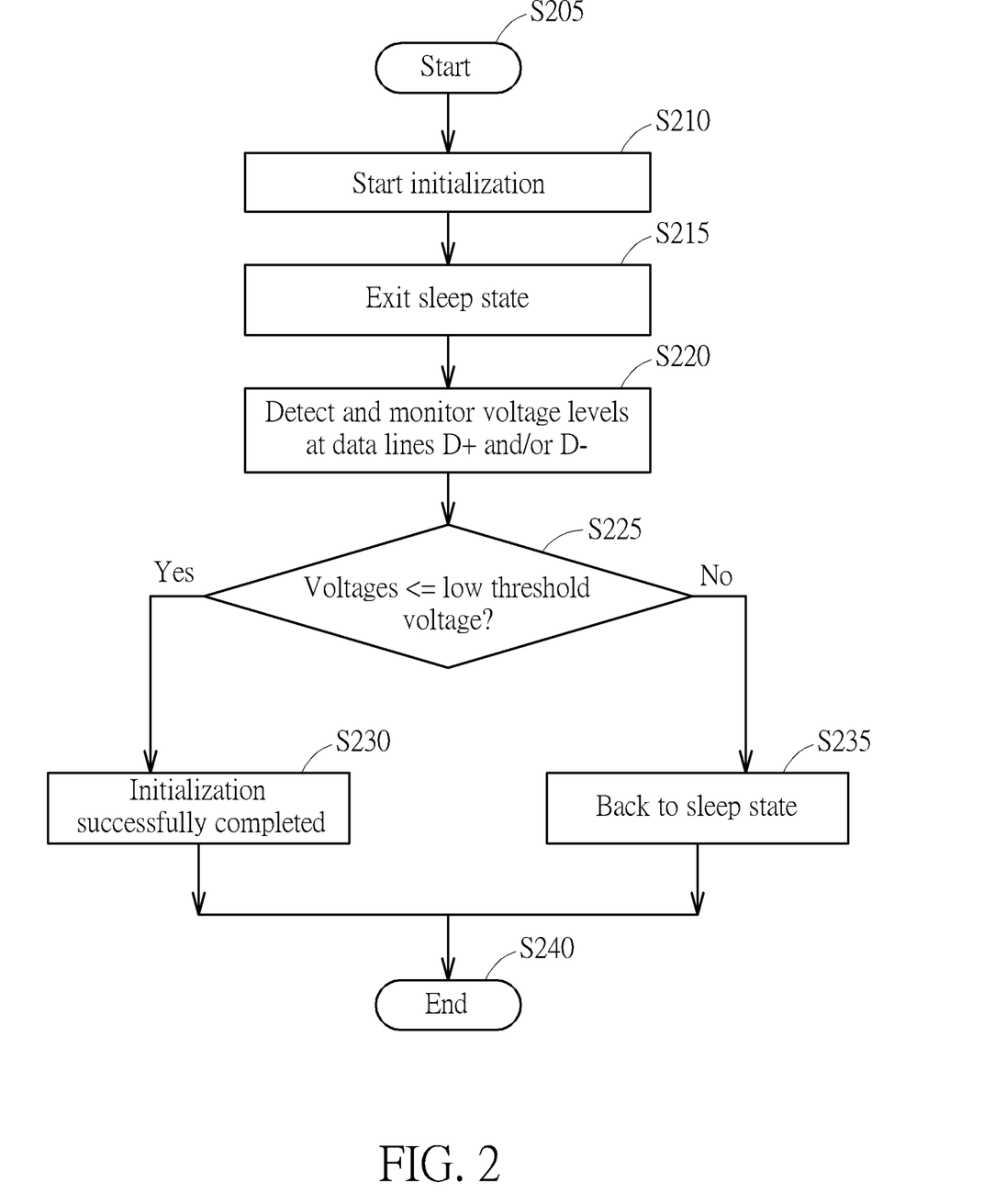
FIG. 2 is a diagram of a flowchart of the analog detection operations of the pointing device as shown in FIG. 1 according to an embodiment of the invention.

FIG. 2 is a diagram of a flowchart of the operations of the pointing device 100 as shown in FIG. 1 according to an embodiment of the invention. Provided that substantially the same result is achieved, the steps of the flowchart shown in FIG. 2 need not be in the exact order shown and need not be contiguous, that is, other steps can be intermediate. Steps are detailed in the following:

Step S205: Start;

Step S210: the protocol of USB communication interface 102 starts an initialization;

Step S215: USB driver device 115 exits the sleep state and enters the initialized state;

Step S220: USB driver device 115 detects and monitors the voltage levels at the data lines D+ and/or D−;

Step S225: USB driver device 115 determines whether both the voltage levels are lower than the low threshold voltage. If both the voltage levels are lower than the low threshold voltage, the flow proceeds to Step S230, otherwise, the flow proceeds to Step S235;

Step S230: USB driver device 115 determines that the initialization is successfully completed and its USB state can be in the initialized state;

Step S235: USB driver device 115 determines that the initialization is not successfully completed and recovers its USB state from the initialized state back to the sleep state; and Step S240: End.

It should be noted that, the USB driver device 115 in one embodiment may hold or keep the sleep state until the undefined/abnormal behavior disappears. For example, after repeating Steps S220 and S225 for multiple times, once both the voltage levels become lower than the low threshold voltage (in Step S225), the USB driver device 115 can determine that the initialization is successfully completed and its USB state can be in the initialized state. Then, the LED units 105 can be turned on to emit lights.

In another embodiment, the protocol of USB communication interface 102 may be resumed. When the USB driver device 115 exits the sleep state and enters a resumed state, the USB driver device 115 uses the ADC to detect and monitor the voltage levels at the data lines D+ and D− of the USB communication interface 102. If the voltage level at the data line D+ is higher than a high threshold voltage such as 2.7 Volts (but not limited) and the voltage level at the data line D− is lower than the low threshold voltage such as 0.2 Volts (but not limited), then the USB driver device 115 may determine that no undefined/abnormal behaviors occur. In this situation, the USB driver device 115 determines that the protocol of USB communication interface 102 is successfully resumed. Then, the pointing device 100 may be charged by the host system 101 through the lines of USB communication interface 102. That is, when determining that no undefined/abnormal behaviors occur, the USB driver device 115 does not hold/keep the last correct state, i.e. the sleep state.

In another situation, once either the voltage level at the data line D+ becomes lower than the high threshold voltage or the voltage level at the data line D− becomes higher than the low threshold voltage when the USB driver device 115 exits the sleep state and enters the resumed state, the USB driver device 115 determines that an undefined/abnormal behavior occur and is arranged to recover the USB state from the resumed state back to the last correct state (i.e. the sleep state). That is, the USB driver device 115 can determine that the protocol of USB communication interface 102 is not successfully resumed, and the resume procedure is not successfully completed. In this situation, the light emissions of the LED units 105 can be turned off.

Figure 3:
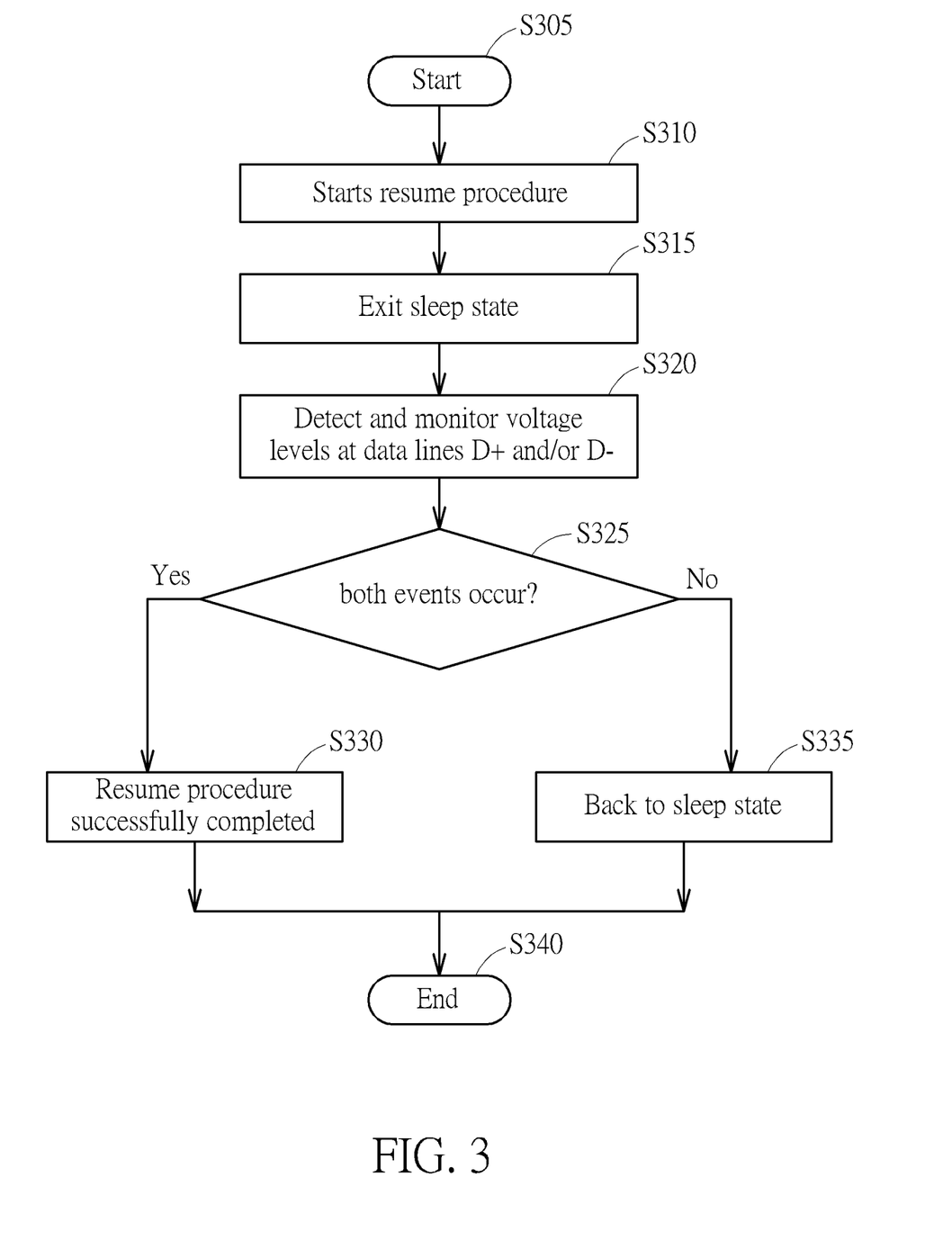
FIG. 3 is a diagram of a flowchart of the analog detection operations of the pointing device as shown in FIG. 1 according to another embodiment of the invention.

FIG. 3 is a diagram of a flowchart of the operations of the pointing device 100 as shown in FIG. 1 according to another embodiment of the invention. Provided that substantially the same result is achieved, the steps of the flowchart shown in FIG. 3 need not be in the exact order shown and need not be contiguous, that is, other steps can be intermediate. Steps are detailed in the following:

Step S305: Start;

Step S310: the protocol of USB communication interface 102 starts a resume procedure;

Step S315: USB driver device 115 exits the sleep state and enters the resumed state;

Step S320: USB driver device 115 detects and monitors the voltage levels at the data lines D+ and/or D−;

Step S325: USB driver device 115 determines whether both events of the voltage level at data line D+ being higher than the high threshold voltage and the voltage level at data line D− being lower than the low threshold voltage occur. If both the events occur, the flow proceeds to Step S330, otherwise, the flow proceeds to Step S335;

Step S330: USB driver device 115 determines that the resume procedure is successfully completed and its USB state can be in the resumed state;

Step S335: USB driver device 115 determines that the resume procedure is not successfully completed and recovers its USB state from the resumed state back to the sleep state; and Step S340: End.

It should be noted that, the USB driver device 115 in one embodiment may hold or keep the sleep state until the undefined/abnormal behavior disappears. For example, after repeating Steps S320 and S325 for multiple times, once both the above-mentioned events occur (in Step S325), the USB driver device 115 can determine that the resume procedure is successfully completed and its USB state can be in the resumed state. Then, the LED units 105 can be turned on to emit lights.

In one embodiment, for logical detection, when the pointing device 100 exits the sleep state and enters the initialized or resumed state, the processing circuit 110 can start or activate a specific watchdog timer (WDT) to monitor whether a start of frame (SOF) or an interrupt token is received by the USB driver device 115 before the specific watchdog timer expires or timeouts, and the processing circuit 110 is arranged to make the USB driver device 115 be recovered from the initialized or resumed state back to the sleep state.

Figure 4:
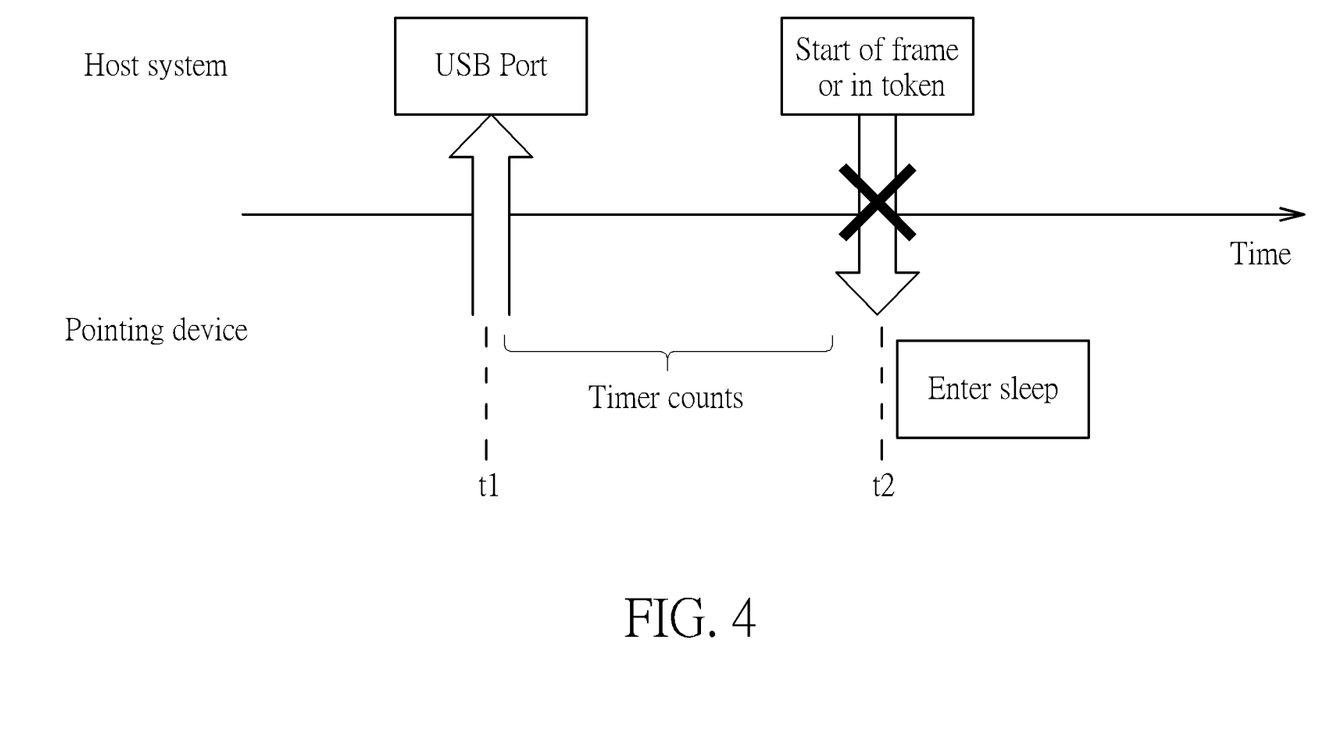
FIG. 4 is a diagram showing the logical detection operation of pointing device as shown in FIG. 1 according to an embodiment of the invention.

FIG. 4 is a diagram showing the logical detection operation of pointing device 100 as shown in FIG. 1 according to an embodiment of the invention. As shown in FIG. 4, at timing t1, when the pointing device 100 exits the sleep state, the pointing device 100 can send a USB remote wake-up command to the USB port of the host system 101 via the USB communication interface 102, wherein the USB remote wake-up command is used to force the host system 101 leaving the suspended state/mode. At the same time, the processing circuit 110 starts the specific watchdog timer to monitor whether the start of frame (SOF) or an interrupt token is received by the USB driver device 115. In FIG. 4, for example, the start of frame (SOF) or interrupt token is not received by the pointing device 100 before timing t2, and then at timing t2 the specific watchdog timer expires. Then, the processing circuit 110 controls the USB driver device 115 switching from the wake-up state (i.e. initialized or resumed state) back to the sleep state.

It should be noted that, in the embodiments, the LED unit(s) 105 is/are turned on to emit lights only when the procedure of the wake-up state (e.g. initialized or resumed state) is successfully completed. That is, the LED unit(s) 105 is/are turned off to not emit lights when the procedure of the wake-up state is not successfully completed.

Figure 5:
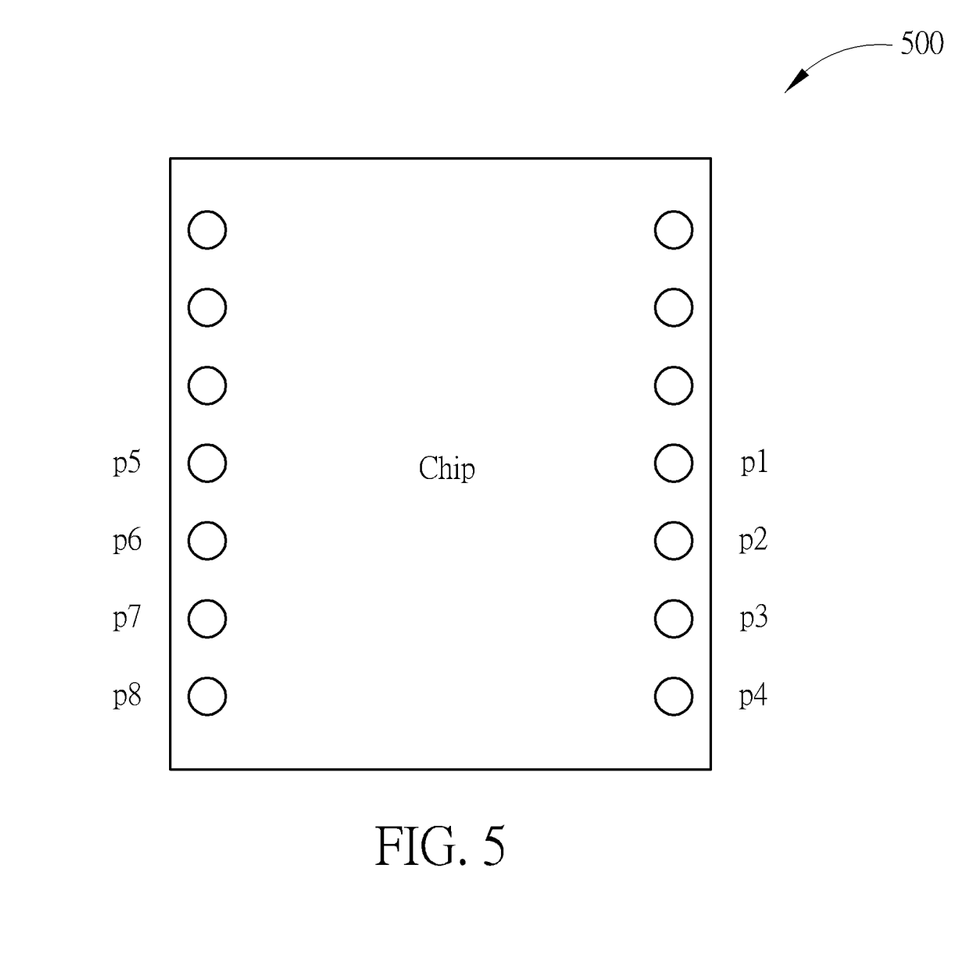
FIG. 5 is a top view diagram of a circuit structure of a chip device according to an embodiment of the invention.

FIG. 5 is a top view diagram of a circuit structure of a chip device 500 according to an embodiment of the invention. The chip device 500 comprises multiple pins as shown in FIG. 5. The multiple pins may comprise eight GPIO (General Purpose Input/Output) pins p1, p2, p3, p4, p5, p5, p6, p7, and p8, and other pins such as the power supply pin, ground pin, and so on.

In the embodiment, the chip device 500 for example is an optical navigation chip (but not limited), and it can be other type chips. In the chip device 500, if the eight pins p1-p8 are configured to respectively correspond to the input/output control of one button, then the chip device 500 is configured to have the configuration of eight different buttons. Alternatively, in other embodiment, if the eight GPIO pins p1-p8 are implemented by the key scan method, then the chip device 500 can be configured to have the configuration of 4*4 (i.e. 16) different buttons. However, if all the pins are implemented by the key scan method, then the ghost key may occur.

To solve the problems, in this embodiment, a portion of GPIO pins are configured to respectively correspond to the input/output control of one button, and another portion of GPIO pins are configured to be implemented by the key scan method. This can significantly reduce the number of ghost keys as well as increase the total number of buttons for the chip device 500.

For example, in one embodiment, the GPIO pins such as pins p1-p3 may respectively correspond to the input/output of one button, and other GPIO pins p4-p8 are implemented by using the key scan method. Thus, the key scan method can make the chip device 500 have the configuration of 3*2 (i.e. 6) buttons, and the chip device 500 can have the configuration of total 9 buttons in which three buttons are not associated with ghost keys. Thus, this reduces the number of ghost keys caused by the key scan method.

Similarly, in other embodiments, when the GPIO pins such as pins p1-p2 respectively correspond to the input/output of one button and other GPIO pins p3-p8 are implemented by using the key scan method, the key scan method can make the chip device 500 have the configuration of 3*3 (i.e. 9) buttons, and the chip device 500 can have the configuration of total 11 buttons in which two buttons are not associated with ghost keys. Thus, this reduces the number of ghost keys caused by the key scan method.

Compared to that all the GPIO pins are implemented by using the key scan method, the invention can reduce the number of ghost keys.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mouse device, used to be coupled to a host system through a universal serial bus (USB) communication interface, comprising:

a USB driver device, configured for communicating with the host system via the USB communication interface; and a processing circuit, coupled to the USB driver device, arranged for controlling the USB driver device;

wherein the USB driver device is arranged for monitoring a specific voltage change or a specific data transmission state of the USB communication interface to generate a monitoring result, and for correcting a USB state of the USB driver device when the monitoring result indicates that an undefined or abnormal behavior of the host system occurs;

wherein the USB driver device is kept at the corrected USB state and the mouse device is not turned on to flash lights when the mouse device is connected to the host system but the host system is powered down.

2. The mouse device of claim 1, wherein when a protocol of the USB communication interface is initialized or resumed and the undefined or abnormal behavior of the host system occurs, the USB driver device is arranged to make the USB state be recovered from a wake-up state back to a sleep state.

3. The mouse device of claim 1, wherein the USB driver device is arranged for performing a USB charging portion detection by monitoring at least one voltage level of at least one data line of the USB communication interface.

4. The mouse device of claim 3, wherein the USB driver device determines that the USB state is successfully initialized when a voltage level at a data line D+ of the USB communication interface is lower than a low threshold voltage and a voltage level at a data line D− of the USB communication interface is lower than the low threshold voltage.

5. The mouse device of claim 4, wherein the USB driver device determines that the USB state is switched from a initialized state back to a sleep state when either the voltage level at the data line D+ or the voltage level at the data line D− is higher than the low threshold voltage.

6. The mouse device of claim 3, wherein the USB driver device determines that the USB state is successfully resumed when a voltage level at a data line D+ of the USB communication interface is higher than a high threshold voltage and a voltage level at a data line D− of the USB communication interface is lower than a low threshold voltage.

7. The mouse device of claim 6, wherein the USB driver device determines that the USB state is switched from a resumed state back to a sleep state when either the voltage level at the data line D+ becomes lower than the high threshold voltage or the voltage level at the data line D− becomes higher than the low threshold voltage.

8. The mouse device of claim 1, wherein when a protocol of the USB communication interface is initialized or resumed, the USB driver device starts a specific watchdog timer to monitor whether a start of frame or an interrupt token is received before the specific watchdog timer expires, and the USB driver device determines that the USB state is switched back to a sleep state when the specific watchdog timer expires and no start of frames or no interrupt tokens are received.

9. The mouse device of claim 1, further comprising:
at least one light emitting unit, arranged for emitting light;
wherein the at least one light emitting unit is turned off to stop light emission when the monitoring result indicates the undefined or abnormal behavior of the host system occurs.

10. A method of a mouse device which is used to be coupled to a host system through a universal serial bus (USB) communication interface, and the method comprises:
providing a USB driver device to communicate with the host system via the USB communication interface;
monitoring a specific voltage change or a specific data transmission state of the USB communication interface to generate a monitoring result; and
correcting a USB state of the USB driver device when the monitoring result indicates that an undefined or abnormal behavior of the host system occurs;
wherein the USB driver device is kept at the corrected USB state and the mouse device is not turned on to flash lights when the mouse device is connected to the host system but the host system is powered down.

11. The method of claim 10, wherein the correcting step comprises:
making the USB state be recovered from a wake-up state back to a sleep state when a protocol of the USB communication interface is initialized or resumed and the undefined or abnormal behavior of the host system occurs.

12. The method of claim 10, wherein the monitoring step comprises:
performing a USB charging portion detection by monitoring at least one voltage level of at least one data line of the USB communication interface.

13. The method of claim 12, further comprising:
determining that the USB state is successfully initialized when a voltage level at a data line D+ of the USB communication interface is lower than a low threshold voltage and a voltage level at a data line D− of the USB communication interface is lower than the low threshold voltage.

14. The method of claim 13, further comprising:
determining that the USB state is switched from an initialized state back to a sleep state when either the voltage level at the data line D+ or the voltage level at the data line D− is higher than the low threshold voltage.

15. The method of claim 12, further comprising:
determining that the USB state is successfully resumed when a voltage level at a data line D+ of the USB communication interface is higher than a high threshold voltage and a voltage level at a data line D− of the USB communication interface is lower than a low threshold voltage.

16. The method of claim 15, further comprising:
determining that the USB state is switched from a resumed state back to a sleep state when either the voltage level at the data line D+ becomes lower than the high threshold voltage or the voltage level at the data line D− becomes higher than the low threshold voltage.

17. The method of claim 10, further comprising:
when a protocol of the USB communication interface is initialized or resumed, starting a specific watchdog timer to monitor whether a start of frame or an interrupt token is received before the specific watchdog timer expires; and
determining that the USB state is switched back to a sleep state when the specific watchdog timer expires and no start of frames or no interrupt tokens are received.

18. The method of claim 10, further comprising:
providing at least one light emitting unit for emitting light; and turning off the at least one light emitting unit to stop light emission when the monitoring result indicates the undefined or abnormal behavior of the host system occurs.

\* \* \* \* \*